(12) United States Patent
Simon

(10) Patent No.: US 6,704,215 B2
(45) Date of Patent: Mar. 9, 2004

(54) METHOD FOR CONTROLLING A MATRIX CONVERTER

(75) Inventor: Olaf Simon, Bruchsal (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/443,565

(22) Filed: May 22, 2003

(65) Prior Publication Data
US 2003/0202370 A1 Oct. 30, 2003

Related U.S. Application Data

(63) Continuation of application No. PCT/DE01/04346, filed on Nov. 19, 2001.

(30) Foreign Application Priority Data

Nov. 22, 2000 (DE) .......................... 100 57 784

(51) Int. Cl.[7] .............................. H02M 5/20
(52) U.S. Cl. ................... 363/159; 363/98; 363/132
(58) Field of Search .................... 363/97, 98, 131, 363/132, 157, 159, 164, 165

(56) References Cited

U.S. PATENT DOCUMENTS 5,949,672 A * 9/1999 Bernet ........................ 363/159
6,333,569 B1 * 12/2001 Kim ............................ 307/31

OTHER PUBLICATIONS

Huber et al, "Space vector modulated three phase to three phase matrix converter with input power factor correction", IEEE Industry Applications vol. 31 Issue 6 pp. 1234–1246.*

Watthanasarn et al "Analysis and DSP based Implementation of Modulation Algorithms", Power Electronics Specialists Conference, 1996. PESC '96 Record., 27th Annual IEEE, vol.: 2, Jun. 23–27, 1996 Page(s): 1053–1058 vol. 2.*

Zhang, "Analysis and comparison of control techniques for AC–AC matrix converters", ♡♡Electric Power Applications, IEE Proceedings–, vol.: 145 Issue: 4 , Jul. 1998, Page(s): 284–294♡♡.*

L. Huber et al.: "Space vector modulated three–phase to three–phase matrix converter with input power factor correction", in: IEEE Transaction on Industry Applications, Nov./Dec. 1995.

Wiechmann et al.: "Fuzzy logic controlled direct frequency converters modulated by an expert knowledge–based space vector technique", in: IEEE, Jan. 1997.

A. Alesina et al.: "Analysis and design of optimum–amplitude nine–switch direct ac–ac converters", in: Transactions on Power Electronics, Jan. 1989.

Nielsen et al.: "Space vector modulated matrix converter with minimized number of switchings and a feedforward compensation of input voltage unbalance", in: Proceedings 96, 1996, no month.

Ziegler et al.: "Semi natural two steps commutation strategy for matrix converters", in: IEEE, Aug. 1998.

* cited by examiner

*Primary Examiner*—Michael Sherry
*Assistant Examiner*—Gary L. Laxton
(74) *Attorney, Agent, or Firm*—Henry M. Feiereisen

(57) ABSTRACT

The invention relates to a method for controlling a matrix converter with nine bi-directional power switches arranged in a 3×3 switch matrix. Four active switching states and one zero voltage switching state and the associated time intervals are calculated per modulation interval using space-vector modulation. The calculated interval of the zero voltage switching state is distributed to at least two of a total of three available zero voltage switching states, thereby eliminating or at least significantly reducing output voltage errors of the matrix converter.

5 Claims, 4 Drawing Sheets

FIG 2

| Time Interval | Switching State |
|---|---|
| Tαμ = b | 121 |
| Tβμ = a | 122 |
| Tβν = e | 133 |
| Tαν = d | 131 |
| To = c | 111 |

FIG 3

| Time Interval | Switching State |
|---|---|
| To = c/2 | 222 |
| Tβμ = a | 122 |
| Tαμ = b | 121 |
| Tαν = d | 131 |
| Tβν = e | 133 |
| To = c/2 | 333 |

FIG 4

| Time Interval | Switching State |
|---|---|
| To = c/3 | 222 |
| Tβμ = a | 122 |
| Tαμ = b | 121 |
| To = c/3 | 111 |
| Tαν = d | 131 |
| Tβν = e | 133 |
| To = c/3 | 333 | ial application no. PCT/DE01/04346, filed Nov. 19, 2001, on which priority is claimed under 35 U.S.C. §120, the disclosure of which is hereby incorporated by reference.

This application claims the priority of German Patent Application, Serial No. 100 57 784.9, filed Nov. 20, 2000, pursuant to 35 U.S.C. 119(a)–(d), the disclosure of which is incorporated herein by reference.

BACKGROUND OF THE INVENTION

The present invention relates to a method for controlling a matrix converter, in particular a method using space vector modulation.

A matrix converter is a self-commutated direct converter. It enables the conversion of a constant three-phase system into a system with variable voltage and frequency. Through the arrangement of the bidirectional power switches in a 3×3 switch matrix, each of the three output phases of the matrix converter can be electrically connected to any one input phase. One phase of the matrix converter includes an arrangement of three bidirectional power switches wherein each switch is connected, on the one hand, to an input phase and, on the other hand, to an output phase. An arrangement of this type is also referred to as a 3×1 switch matrix. The matrix converter does not require an intermediate circuit. Due to its topology, the self-commutated direct converter advantageously has a recovery capability and achieves sinusoidal mains currents through a suitably designed control.

Each of the bidirectional power switches of the matrix converter has two anti-serially connected semiconductor switches. Insulated Gate Bipolar Transistors (IGBT) are preferably used as semiconductor switches, which each include an antiparallel diode. Bidirectional power switches designed in this way are preferably used in converters for low and medium power. Through the control of these semiconductor switches of the bidirectional power switches, a continuous current path is established in a direction determined by the arrangement of the semi-conductor switches. If both semiconductor switches of a bidirectional power switch are controlled, the latter is bidirectionally activated and a current can flow in both directions. This creates a safe electrical connection between an input phase and an output phase of the matrix converter. If only one semiconductor switch of a bidirectional power switch is controlled, the latter is unidirectionally activated, creating an electrical connection between an input phase and an output phase of the matrix converter only for a preferred current direction.

Any desired time-averaged output voltage can be obtained—within certain limits—by a controlled temporal sequence of combinations of switch positions within a modulation period. A matrix converter includes a controller capable of computing a suitable switch combination based on information about the input voltage space vector and a desired value for the output voltage space vector.

Conventional control methods operate either according to a phase-oriented or a vector-oriented method.

The phase-oriented control method is described in the publication "Analysis and Design of Optimum-Amplitude Nine-Switch Direct AC—AC Converters", by Alberto Alesina and Marco G. B. Venturini, IEEE Transactions on Power Electronics, Vol. 4, No. 1, January 1989, pp. 101–112. The space vector control method is described in "Space Vector Modulated Three-Phase to Three-Phase Matrix Converter with Input Power Factor Correction", by László Huber and Dušan Borejević, IEEE Transactions on Industrial Applications, Vol. 31, No. 6, November/December 1995, pp. 1234–1245.

The publication "Space Vector Modulated Matrix Converter with Minimized Number of Switchings and a Feedforward Compensation of Input Voltage Imbalance", by P. Nielsen, F. Blaabjerg, and J. K. Pedersen, Proceedings of the 1996 International Conference on Power Electronics, Drives and Energy Systems for Industrial Growth, pp. 833–839, discloses a method for reducing the number of commutations. With his method, four active switching states and one switching state which generates at the output of the matrix converter a voltage space vector with zero amplitude, is calculated using a space vector modulation method. The switching states are referred to in this reference as active vectors and as Null vector. During the space vector modulation of a matrix converter, the input current vector and the output voltage vector can be located in the same sector or in neighboring sectors. Other combinations are possible in addition to the aforedescribed combinations. The pulse frequency, i.e. the voltage space vector sequence, is usually configured symmetrically, with the null vector being located in the center relative to the four active vectors. If the input current vector and the output voltage vector of the matrix converter are located in the same sector, then the pulse sequence results in eight commutations. Conversely, if the input current vector and the output voltage vector of the matrix converter are located in neighboring sectors, then the pulse sequence results in ten commutations, without optimization. By using the optimization proposed in the reference, a pulse sequence is generated which has also only eight commutations. The optimized pulse sequence is obtained by combining the calculated four active vectors and a null vector. The optimized pulse sequence differs from the non-optimized pulse sequence in that the pulse sequence of the active vectors is reversed in time and a suitable Null vector is selected. The null vector is selected from the three possible null vectors so that only one commutation takes place. With this optimized space vector modulation method, only eight commutations occur during each modulation period. Reducing the number of commutations per modulation period also reduces the switching losses of the matrix converter.

According to the last reference, eight commutations are always required when implementing the switching states calculated with a space vector modulation method in a modulation interval, also referred to as modulation period or half modulation period. Commutation takes place in several steps which have to be separated by a blocking time. As a result, commutation is subject to time constraints which result in a minimum on period. The commutation is controlled in a modulator connected after a controller. Output voltage errors result if on periods are calculated that cannot be realized with the commutation controller.

Because a difference between an on period calculated by the control set and an actual on period leads to a control error, such error should advantageously be eliminated, and the on periods should be calculated by the control set so as not to produce on periods that are shorter than a predetermined minimum on period.

Conventional controls based on space vector modulation accept the resulting errors. The controls are optimized only for attempting to keep the minimum on period as short as possible. This is achieved with a control method for a matrix converter as described in the publication "Semi Natural Two Steps Commutation Strategy for Matrix Converters", by M. Ziegler, W. Hofman, in PESC, 1998, pp. 727–731. The method is based on a new definition of the 60° elec. sectors. The sector boundaries are here no longer defined by the zero crossings of the phase voltages of the input power grid, but rather by the zero crossings of the linked phase voltages. As a result, three voltage potentials $V_P$, $V_M$ and $V_N$ occur in each 60° elec. sector, which can be easily determined. This method uses only two steps instead of four steps to switch from one main state to another, thereby significantly reducing the minimum on period. This commutation method, however, cannot prevent that switching states are calculated with a space vector modulation method that have minimum on periods less than a predetermined on period, since the space vector modulation method and the commutation control are performed in two different planes.

It would therefore be desirable and advantageous to provide an improved method for controlling a matrix converter, which obviates prior art shortcomings and eliminates output voltage errors on the matrix converter.

SUMMARY OF THE INVENTION

According to one aspect of the present invention, a method for controlling a matrix converter, with nine bidirectional power switches arranged in a 3×3 switch matrix, includes the steps of computing with a space vector modulation method for each modulation interval four active switching states and a zero switching state; computing for the active and zero switching states corresponding time periods; and distributing the calculated time period of a zero switching state over at least two of the three available zero switching states. This does not prevent the computation of switching states with an on period shorter than a predetermined minimum on period. However, such switching states do not cause output voltage errors in the matrix converter, because the switching states to be completed between the output phases and an input phase are lengthened with prepended or appended zero switching states. In the simplest case, all three zero switching states of the matrix converter are utilized during a modulation period. The calculated active switching states determine how these zero switching states are combined with the four active switching states into a pulse sequence. The problem is hence corrected at the origin and not handed over to other functional blocks.

According to one advantageous feature of the invention, the switching state, which is selected as a zero switching state, lengthens a calculated time period for an output phase if the time period for that output phase is shorter than or equal to a minimum switching time. It is thus possible to always find from the available three zero switching states of the matrix converter at least two suitable zero switching states for the four active switching states of a modulation period so as to eliminate output voltage errors. Since the minimum switching time is indirectly checked when the zero switching states are selected, no additional analysis is required in the subsequent commutation control circuit.

According to another advantageous feature of the invention, the calculated time period of the zero switching state of a modulation period is uniformly distributed over the utilized zero switching states. This achieves a quasi-symmetric association which guarantees a minimum on period of one third of the calculated time period of the calculated time period of the zero switching state of a modulation period when using three zero switching states. As a result, the range where the method of the invention can be used increases for small output voltages.

According to another advantageous feature of the invention, the calculated time period of the zero switching state of a modulation period is symmetrically associated with the utilized zero switching states. In this way, the range can be increased for small output voltages and hence the method of the invention can be more widely applied. However, the space vector modulation method cannot guarantee the minimum on period at the transition between switch boundaries.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows a table with calculated switching states with their associated time intervals;

FIGS. 3 and 4 show each a table with calculated switching states that have at least two zero switching states;

DETAILED DESCRIPTION OF PREFERRED EMBODIMENTS

Figure 1:
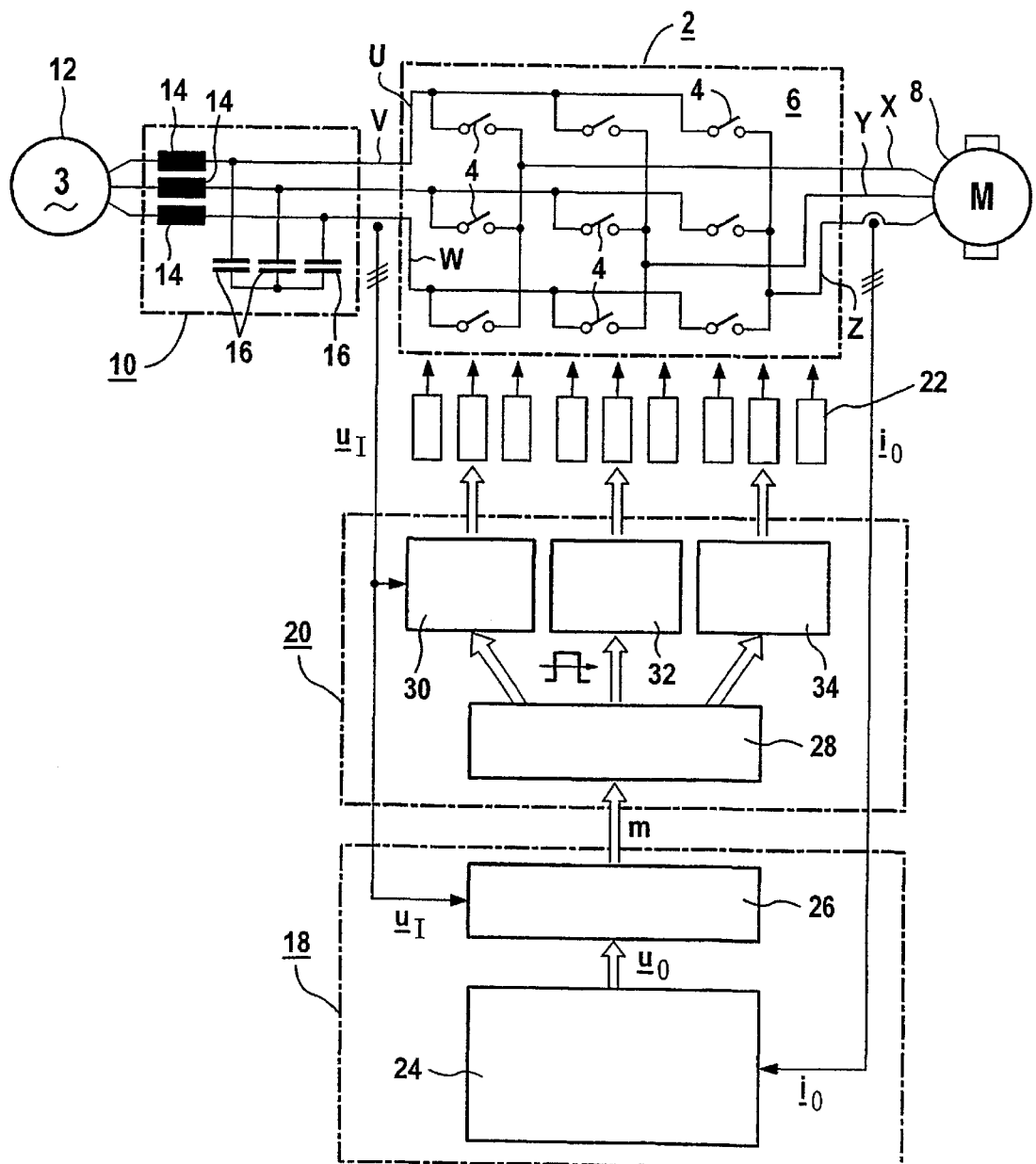
FIG. 1 shows a functional circuit diagram of a matrix converter.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown in detail a functional circuit diagram of an exemplary three-phase matrix converter 2. The three-phase matrix converter 2 has nine bidirectional power switches 4, which are arranged in a 3×3 switch matrix 6. The arrangement of the nine bidirectional power switches 4 in a 3×3 switch matrix 6 allows each output phase X, Y, Z to be switched to any desired input phase U, V, W. An inductive load 8 is connected to the output phases X, Y, Z of the matrix switch 2. The input phases U, V and W are connected with an LC-filter 10, which is connected on the input side to a power mains system 12. The LC filter 10 includes inductors 14 and capacitors 16. The capacitors 16 are shown here in a star configuration, although a delta configuration is also possible. The inductors 14 are arranged in the supply lines to the capacitors 16, thereby smoothing the charge currents. One phase of the matrix converter 2 has three bidirectional power switches 4 adapted to connect an output phase X or Y or Z, respectively, with the input phases U, V, W. This matrix converter phase has a 3×1 switch matrix.

The schematic circuit diagram of the exemplary three-phase matrix converter 2 also shows a control device 18, a modulation device 20 and nine driver devices 22. The control device 18 includes a load regulator 24 and a control set 26. The load regulator 24 receives at its input a measured load current vector $i_o$ and produces an output voltage vector $u_o$. The load regulator 24 can be, for example, a field-oriented regulator. By applying the space vector modulation method, the control set 26 connected after the load regulator 24 calculates drive levels m as a function of the generated output voltage vector $u_o$ and of a measured input voltage vector $u_I$. The control device 18 is preferably implemented as a digital signal processor.

The modulation device 20 connected after the control device 18 has on the input side a modulator 28 and on the output side for each matrix converter phase a commutation controller 30, 32, and 34. Depending on the applied drive level m, the modulator 28 generates pulse-width-modulated signals which are each checked and processed in the commutation controllers 30, 32, and 34 with respect to blocking time, minimum on period and open time. The commutation controllers 30, 32, and 34 need to know the polarity of the linked input voltages of the matrix converter 2 which are described by an input voltage space vector $u_I$. Control signals (On/Off signals) are provided at the outputs of the commutation controllers 30, 32, and 34, which are converted by a driver device 22 into a gate signal which is independent of the specific embodiment of the bidirectional power switch 4. The modulation device 20 is preferably implemented by a Programmable Logic Device, in particular a field programmable gate array.

FIG. 2 shows a two-column table, with the first column showing the time period and the second column showing the switching state. Four active switching states 121, 122, 133 and 131 and a zero switching state 111 are listed in the second column for one modulation period or half a modulation period and mirror-symmetric modulation. The active switching states 121, 122, 133 and 131 generate an output voltage space vector $u_o$ that is different from zero. Zero switching state 111 generates an output voltage space vector $u_o$ with zero amplitude. The corresponding space vectors are referred to in the technical literature as active space vectors and null vectors.

As seen from the table, the switching state of a matrix converter 2 can be described by a triad, such as 122. The first digit indicates the input phase of the matrix converter 2 to which the first output phase X is to be connected. The second digit indicates the input phase of the matrix converter 2 to which the second output phase Y is to be connected. And the third digit indicates input phase of the matrix converter 2 to which the third output phase Z is to be connected. According to the switching state 122, the first output phase X is to be connected with the input phase U, the second output phase X with the input phase V and the third output phase Z of the matrix converter 2 is to be connected with the input phase V. The time interval $T\beta\mu=a$ associated with this switching state indicates the duration of this switching state. When the switching state 122 is executed, the corresponding bidirectional power switches 4 are closed.

The table of FIG. 2 shows a calculated example from the published reference Huber, Borojević, in particular Table III and FIG. 9 therein, which is obtained in the input voltage sector I by assuming an input power factor of cos φ=1.

In addition to the zero switching state 111 there exist two other zero switching states 222 and 333. As shown in the table of FIG. 2, only the switching state 111 of the three switching states 111, 222 and 333 is used. According to the method of the invention, the calculated time interval c for a zero switching state is to be distributed over at least two zero switching states.

FIG. 3 shows a table wherein the four active switching states 121, 122, 131 and 133 are augmented by two exemplary zero switching states 222 and 333. The associated time interval c for both zero switching states is uniformly distributed over the two zero switching states 222 and 333. These two zero switching states 222 and 333 form the corresponding start and end of a pulse train composed of the four active switching states 121, 122, 131 and 133 and the two zero switching states 222 and 333. These switching states are sequentially arranged in such a way that only one commutation takes place between two neighboring states, hereby preventing very short on periods of individual power switches 4 of the matrix converter 2. The calculated time intervals a and e are each assumed to be shorter than a minimum on period $t_{min}$. With this assumption, the third output phase Z of the matrix converter 2 would be connected to the input phase V and/or input phase W of the matrix converter 2 for a time that is shorter than the minimum on period $t_{min}$. The short on periods a and e can result in a control error which would be indicated by an output voltage error in the matrix converter 2.

To prevent this, the switching states with the time intervals a and e that are shorter than a minimum on period $t_{min}$ are flanked by the zero switching states 222 and 333. As a result of the zero switching state 222, the third output phase Z of the matrix converter 2 does not change from the input phase V to the input phase U after the time interval a, but rather after the time intervals a and c/2. Likewise, the on period of the output phase Z with the input phase W is lengthened by the time interval c/2.

FIG. 4 shows a table wherein the four active switching states 121, 122, 131 and 133 are augmented by the three zero switching states 111, 222 and 333. This table illustrates the pulse sequence of a modulation period or half a modulation period. Using the three zero switching states 111, 222 and 333 eliminates the short on periods of individual bidirectional power switches 4 of the matrix converter 2.

The calculated time intervals a, b, d and e of the active switching states determine the zero switching states 111, 222 and 333 to be used. I. e., the zero switching state 111 in the table of FIG. 4 need not be used if the time interval b and d is greater than the minimum on period $t_{min}$, in which case the result of FIG. 3 is obtained. Conversely, if the time interval e is greater than the minimum on period $t_{min}$, then the zero switching state 333 is not needed. The zero switching state 222 is not needed when the time interval a is greater than the minimum on period $t_{min}$.

The calculated time interval c for a zero switching state is in the corresponding tables of FIGS. 3 and 4 distributed uniformly over the switching states 222, 333 and 111, 222, 333. The result is a switching sequence with quasi-symmetrically distributed zero switching states. This quasi-symmetric association guarantees a minimum on period of c/3.

The calculated time interval c for a zero switching state can also be distributed symmetrically over the zero switching states 111, 222, and 333. The symmetric association looks as follows:

Zero switching state 222 with a time interval c/4
Zero switching state 111 with a time interval c/2
Zero switching state 333 with a time interval c/4

This symmetric association guarantees a minimum on period of c/4 for a zero switching state, but typically provides for a minimum on period of c/2 as long as the active switching states are not changed. The greater the guaranteed minimum on period for a zero switching state, the greater the voltage range in which the method can be employed. A prerequisite for employing the method according to the invention is that an adequate time interval c is calculated for a zero switching state, which can then be distributed in some manner over at least two zero switching states. The increase in the time interval c is inversely correlated with the output voltage amplitude to be regulated.

Figure 5:
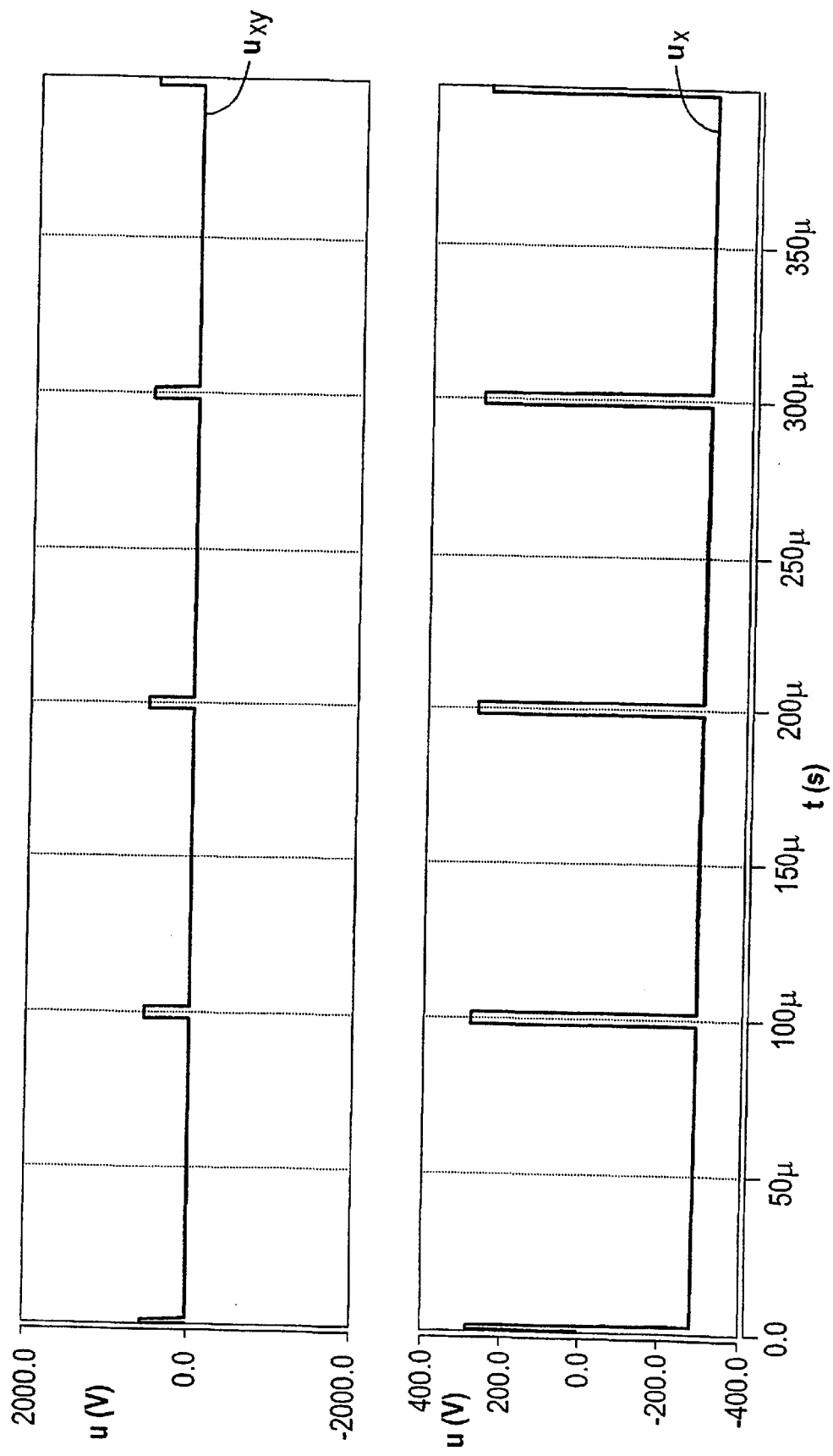
FIG. 5 shows a diagram of a linked output voltage and a phase voltage for a known space vector modulation as a function of time t.

FIG. 5 shows in form of a diagram the switching characteristic of a linked output voltage $u_{XY}$ and a phase output voltage $u_X$ with reference to the star point of the input voltage system of the matrix converter 2. The output voltage is—depending on the switching state—composed of segments of the input voltages $U_U$, $U_V$ and $U_W$, whereby the conventional space vector modulation method with a single zero switching state is used. The short pulses required for a small averaged output voltage in the linked output voltage $u_{XY}$ result also in very short pulses in the phase voltage $u_X$ having a duration that is directly proportional to an on period.

Figure 6:
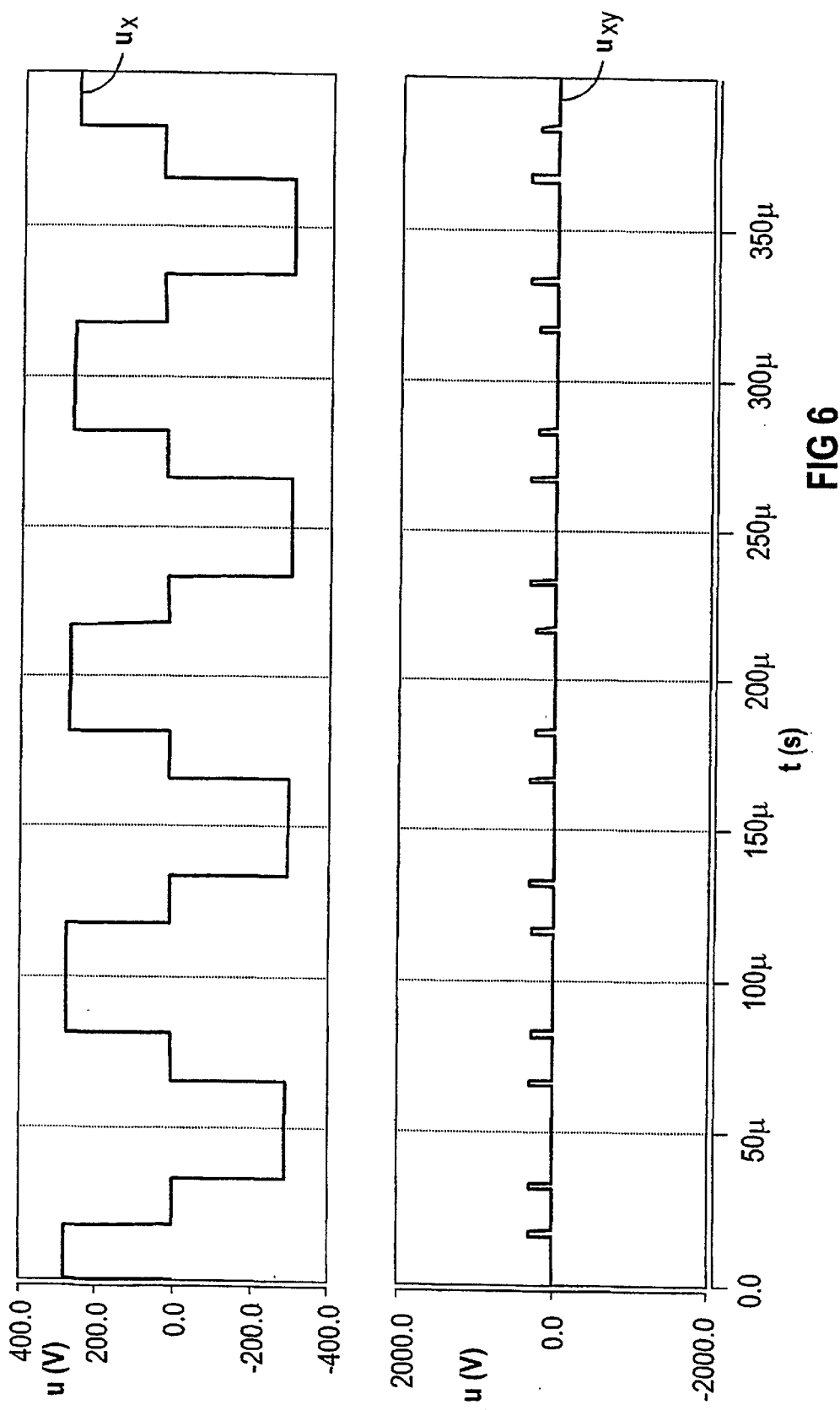
FIG. 6 shows a diagram of a linked output voltage and a phase voltage for a space vector modulation according to the invention as a function of time t with quasi-symmetrically distributed zero switching states.

FIG. 6 shows in form of a diagram the switching characteristic of a linked output voltage $u_{XY}$ and a phase output voltage $u_X$ with reference to an input star point of the matrix converter, using the space vector modulation method of the invention. The space vector modulation method of the invention has quasi-symmetrically distributed zero switching states. In spite of long pulses in the phase voltage $u_X$, which correspond to long on periods, short pulses can be generated in the linked output voltage $u_{XY}$ for forming small averaged output voltages $U_{XY}$. The modulation frequency is 10 kHz in both cases.

The space vector modulation method for a matrix converter 2 according to the invention can prevent very short on periods of individual bidirectional power switches 4 of a matrix converter 2. Very short on periods are then no longer calculated for small output voltages, thereby eliminating output voltage errors. Switching states are no longer transmitted to a connected commutation control device which may be unable to implement them.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method for controlling a matrix converter, with nine bidirectional power switches arranged in a 3×3 switch matrix, comprising the step of:

computing with a space vector modulation method for each modulation interval four active switching states and a zero switching state;

computing for the active switching states and the zero switching state corresponding time periods; and distributing the calculated time period of a zero switching state over at least two zero switching states.

2. The method of claim 1, wherein there are three available zero switching states and all three available zero switching states are used.

3. The method of claim 1, and further including the step of selecting as a zero switching state with a distributed calculated time period the zero switching state which lengthens an on period of an output phase to an input phase, which by using the calculated time periods would otherwise be less than a minimum switching time.

4. The method of claim 1, wherein the calculated time period of the zero switching state is distributed uniformly over the at least two zero switching states.

5. The method of claim 2, wherein the calculated time period of the zero switching state is associated symmetrically with the at least two zero switching states.

* * * * *